(12) United States Patent
Kristinsson et al.

(10) Patent No.: US 7,837,127 B2
(45) Date of Patent: Nov. 23, 2010

(54) VENTILATION SYSTEM

(75) Inventors: Jon Kristinsson, Deventer (NL); Björn Kristinsson, Reykjavik (IS); Eleonoor Europeo Van Andel, Almelo (NL); Eleonoor Van Andel, Boekelo (NL)

(73) Assignees: Kristinsson-Reitsema B.V., Deventer (NL); Fiwihex B.V., Almelo (NL)

( * ) Notice: Subject to any disclaimer, the term of this patent is extended or adjusted under 35 U.S.C. 154(b) by 708 days.

(21) Appl. No.: 10/557,512

(22) PCT Filed: May 19, 2004

(86) PCT No.: PCT/EP2004/005496

§ 371 (c)(1),
(2), (4) Date: Nov. 30, 2006

(87) PCT Pub. No.: WO2004/104487

PCT Pub. Date: Dec. 2, 2004

(65) Prior Publication Data

US 2007/0095523 A1   May 3, 2007

(30) Foreign Application Priority Data

May 23, 2003   (EP) .................................. 03076572

(51) Int. Cl.
*F24F 7/00* (2006.01)
*F24F 11/00* (2006.01)
*G05D 23/00* (2006.01)
*F24D 5/10* (2006.01)
*F24D 3/16* (2006.01)
*F24H 3/02* (2006.01)
*F28D 7/02* (2006.01)
*F25B 29/00* (2006.01)

(52) U.S. Cl. .................... 236/49.3; 236/49.1; 236/49.4; 236/49.5; 165/299; 165/300; 165/53; 165/54; 165/56; 165/164; 165/248; 165/249; 165/287; 165/288; 454/239; 454/252

(58) Field of Classification Search ....... 236/49.1–49.5; 165/299, 300, 53, 54, 56, 164–167, 248, 165/249, 287–294; 454/238, 239, 252, 258
See application file for complete search history.

(56) References Cited

U.S. PATENT DOCUMENTS

| 4,428,197 | A  | * | 1/1984  | Liljequist ..................... 60/525 |
| 5,832,992 | A  |   | 11/1998 | Van Andel |
| 2002/0153133 | A1 | * | 10/2002 | Haglid ....................... 165/231 |
| 2003/0042012 | A1 |   | 3/2003  | Pearson |
| 2003/0159802 | A1 | * | 8/2003  | Steneby et al. ................ 165/59 |

FOREIGN PATENT DOCUMENTS

| AT | 388228    | 5/1989 |
| DE | 10010817  | 10/2001 |
| DE | 20202538  | 4/2002 |
| EP | 1153250   | 11/2001 |
| NL | 9301439   | 3/1995 |

\* cited by examiner

*Primary Examiner*—Frantz F Jules
*Assistant Examiner*—Travis Ruby
(74) *Attorney, Agent, or Firm*—The Web Law Firm

(57) ABSTRACT

The invention relates to a ventilation system for exchanging the air in a room with outside air, which system comprises: A fine wire heat exchanger having a first channel and a second channel, which channels are in heat-exchanging contact with each other, and wherein the first channel has an inlet connected to outside air and an outlet connected to the air in the room, and wherein the second channel has an inlet connected to the air in the room and an outlet connected to the outside air; balancing means for balancing the flow in both channels, such that the heat transfer is maximized. The invention also relates to a combination of a façade, a room on the inside of and adjacent to the façade and a ventilation system, wherein the inlet of the first channel of the system is connected to outside air on the outside of the façade and the outlet is connected to the air in the room, and wherein the inlet of the second channel is connected to the air in the room and the outlet is connected to the outside air.

13 Claims, 2 Drawing Sheets

VENTILATION SYSTEM

The invention relates to a ventilation system for exchanging the air in a room with outside air.

Nowadays new and renovated buildings are so well insulated and airtight that natural ventilation is almost zero. As humans exhale water vapor and carbon dioxide, artificial ventilation has to be installed, to keep water from condensing into the insulation and to keep the concentration of $CO_2$ and other gases emanating from building materials at safe levels. The buildings are so well insulated that the heat loss that goes along with this necessary ventilation is the largest heat loss from the building when it is cold outside. Therefore heat recovery should be installed.

In order to retrieve the heat with a reasonable efficiency it is necessary to balance the in- and outflow.

Most ventilation systems have now a heat exchanger that exchanges heat between the incoming fresh air stream and the outgoing stale air stream. This heat exchanger is installed centrally, mostly in the attic or top floor. The stale air is taken from kitchen, toilets, and bathrooms by ducts, and the fresh air is distributed to bedrooms and sitting rooms, or offices in the building. These systems have several disadvantages. The cost of the ducts to guide the air to and from the several rooms are high. The ducts need space in the building, which generally results in an increase of the story height. All windows of the building with such a central system have to remain closed, as opening them will imbalance the inflow and outflow, which has a negative effect on the efficiency.

Known systems, for example from EP 1153250, can be installed in door and window posts, but do not have a balancing mechanism.

All these known heat recovering ventilation systems use plate or honeycomb heat exchangers, where the two air flows are either in cross flow or in counter current flow at both sides of a paper or plastic thin sheet through which the heat flows. This arrangement, together with the air speed, sets the energy requirement to achieve the heat exchange, because efficiency and pressure drop are coupled by physical equations that in the economic optimal design makes the electricity needs balance the heat savings for local systems. In the centrally installed case, the electricity use far exceeds the heat saving, because of the extra pressure drop in the ducts.

In cold climates, such as in Canada and Scandinavia, where the use of heat recuperating ventilation is especially indicated, these plate type heat exchanger have problems with freezing. The warm and humid stale air is cooled below the dewing point, and, still inside the plate stack, below the freezing point. The resulting ice clogs the channels, so that frequent thawing is necessary. This makes that in cold weather, these ventilation systems cannot be used reliably. So, paradoxically, there where the need is highest, these ventilation systems cannot easily be used It is an object of the invention to prevent or at least diminish the above mentioned disadvantages.

This object is reached by a ventilation system according to the invention, which system comprises:
- a fine-wire heat exchanger having a first channel and a second channel, which channels are in heat exchanging contact with each other, and wherein the first channel has an inlet connected to outside air and an outlet connected to the air in the room, and wherein the second channel has an inlet connected to the air in the room and an outlet connected to the outside air;
- balancing means for balancing the flow in both channels, such that the heat transfer is maximized.

A fine-wire heat exchanger per se is known from NL 9301439. Such a fine-wire heat exchanger has a very high efficiency.

Unexpectedly, it has proven that when a fine-wire heat exchanger is used for a ventilation system, the ventilation system does not have such severe disadvantages, in particular when used in cold climates. Preliminary tests show that a ventilation system according to the invention will only freeze up after a long period of time, whereas conventional ventilation systems with plate type heat exchangers will freeze up within minutes.

In a preferred embodiment of the ventilation system according to the invention, the balancing means comprise:
- a ventilator arranged in the first channel;
- a ventilator arranged in the second channel;
- at least four temperature sensors arranged in the outlets and inlets of the first and second channel; and
- a controller for comparing the readings of the temperature sensors and for controlling the ventilators in the first and second channel, such that the temperature difference between the inlet and outlet of the first channel corresponds to the temperature difference between the inlet and outlet of the second channel.

These balancing means provide for a low cost system, which can maximize the efficiency of the fine-wire heat exchanger and thus maximize the heat recuperation.

In another preferred embodiment of the ventilation system according to the invention, the balancing means comprise:
- a first double acting cylinder, wherein the piston defines a first chamber and a second chamber;
- a second double acting cylinder, wherein the piston defines a third chamber and a fourth chamber, wherein the piston of the first cylinder is connected to the piston of the second cylinder, such that when the first chamber is enlarged by displacement of the pistons, the third chamber is also enlarged;
- a balancing means outlet and an balancing means inlet; and
- control means for alternately connecting the balancing means outlet with either the first chamber or the fourth chamber, the balancing means inlet with either the second chamber or the third chamber, the first channel with either the fourth chamber or the first chamber, and the second channel with either the third chamber or the second chamber.

This balancing system is especially suitable for surroundings, when a large pressure drop is present between the outside air and the air in the room. Such a pressure drop can result from windy weather at for example the seaside or in mountain areas or high rise buildings. Using ventilators will require much electrical power in order to just overcome this pressure drop.

The two double acting cylinders provide a fully mechanical balancing system, which require only minimal electrical power. This system can be operated with virtually no maintenance.

In another embodiment of the system according to the invention the balancing means comprise at least one ventilator arranged in the balancing means inlet, balancing means outlet, the first channel or the second channel.

The ventilator provides the energy to overcome the friction and ensures that the mechanical balancing means will always work reversibly.

The ventilator enables also the mechanical balancing system to operate also when there is no pressure difference between the outside air and the inside air. The ventilator provides always an over pressure, which drives the double acting cylinders.

Instead of a ventilator, the double piston can also be driven directly by for example a liner motor.

In yet another embodiment the main dimensions of the heat exchanger are adapted to the inside main dimensions of a dish washer. This enables the user to disassemble the ventilation system and to clean the heat exchanger, simply by placing the heat exchanger in a dish washer.

Generally a standard home dish washer has inside main dimensions of somewhat smaller than 0.6 m. Therefore, the main dimensions of the heat exchanger are preferably smaller than 0.55 m.

The invention also relates to a combination of a facade, a room on the inside of and adjacent to the facade and a ventilation system according to any of the preceding claims, wherein the inlet of the first channel of the system is connected to outside air on the outside of the facade and the outlet is connected to the air in the room, and wherein the inlet of the second channel is connected to the air in the room and the outlet is connected to the outside air.

Due to the high efficiency and low power consumption the ventilation system according to the invention is very suitable to be used per room. This eliminates the use of lengths of ducts and enables the users to decide whether they would like to open the window or not. This will not have any influence on the balance of other ventilation systems in other rooms.

In a preferred embodiment, the ventilation system is arranged substantially in the facade. In this way, it will not require much space and do not require additional ducts.

These and other features of the invention will be described in conjunction with the accompanying drawings.

Figure 1:
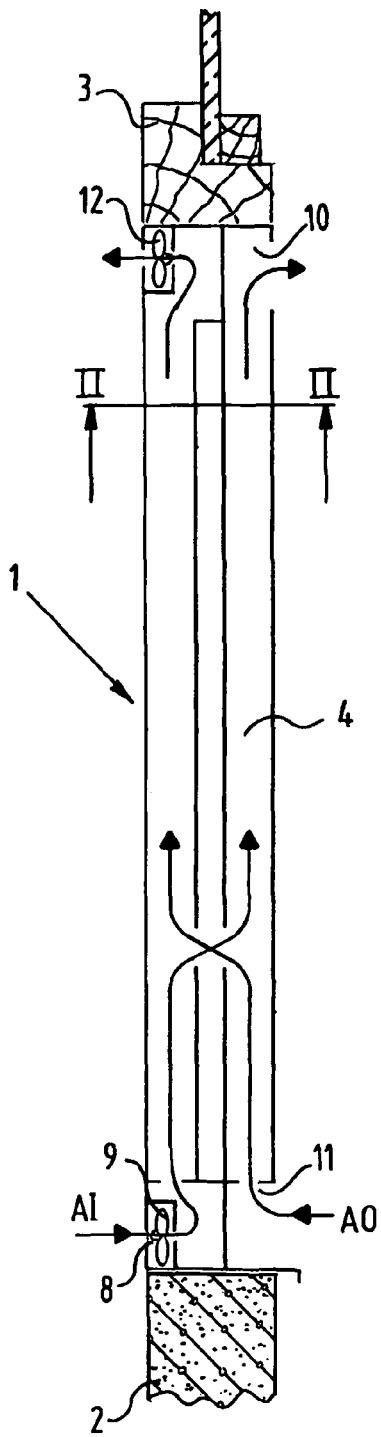
FIG. 1 shows a cross-sectional view of a first embodiment of a ventilation system according to the invention arranged in a facade.

FIG. 1 shows a ventilation system 1 arranged in a facade consisting of a wall 2 and a window frame 3.

Figure 2:
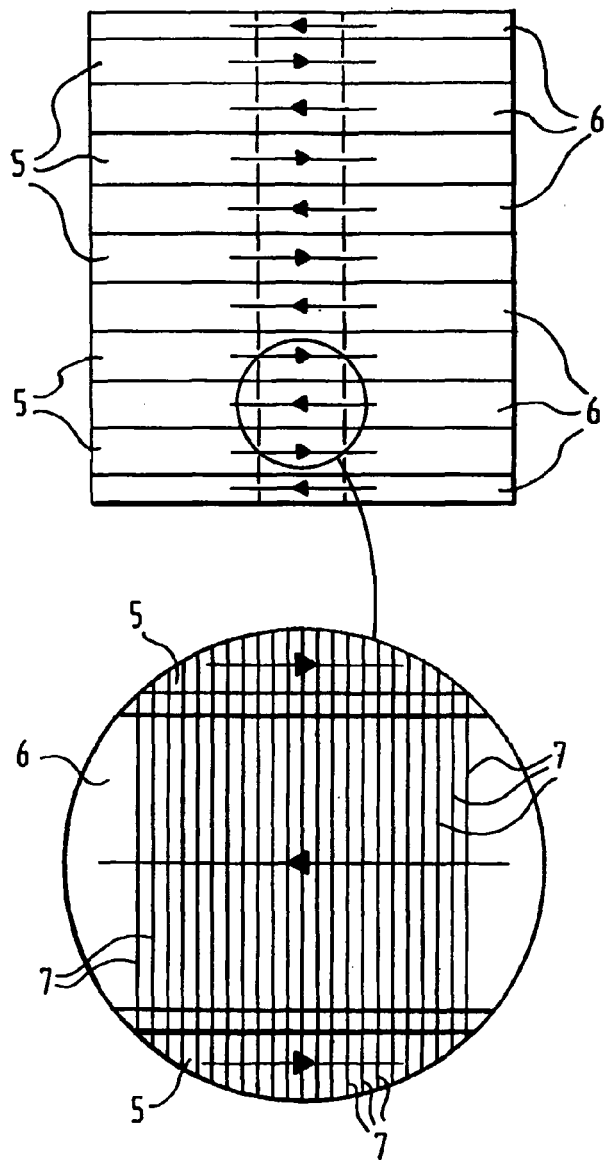
FIG. 2 shows a cross-sectional view of the heat exchanger of the ventilation system of FIG. 1.

The ventilation system 1 comprises a fine wire heat exchanger 4. In FIG. 2 a cross section of this heat exchanger 4 is shown. The heat exchanger 4 has first channels 5 and second channels 6. Heat is exchanged between the first channels 5 and the second channels 6 by fine wires 7.

Air AI from the inside of the room which is adjacent to the facade enters the first channel 5 through opening 8. In this opening 8 a ventilator 9 is arranged, which sucks in the air AI. The air AI is then guided through the heat exchanger 4 and leaves the ventilation system through opening 10.

Fresh outside air AO enters the heat exchanger through opening 11 into the second channels 6 in which it takes up the heat from the inside air AI. The heated fresh air AO is then blown out of the ventilation system 1 by a ventilator 12.

In order to balance the flows of inside air AI and outside air AO the ventilators 8, 12 are controlled. The temperature of the inside air AI entering the heat exchanger is measured and the temperature, when the air leaves the heat exchanger 4. Also the temperature of the outside air AO entering the heat exchanger 4 is measured and the temperature of the outside air AO when it leaves the heat exchanger. The temperature drop of the inside air AI should be the same as the temperature rise of the outside air AO. If this state is reached the fine wire heat exchanger 4 has the largest efficiency. This state can be reached by controlling both ventilators 8 and 12.

Figure 3A:
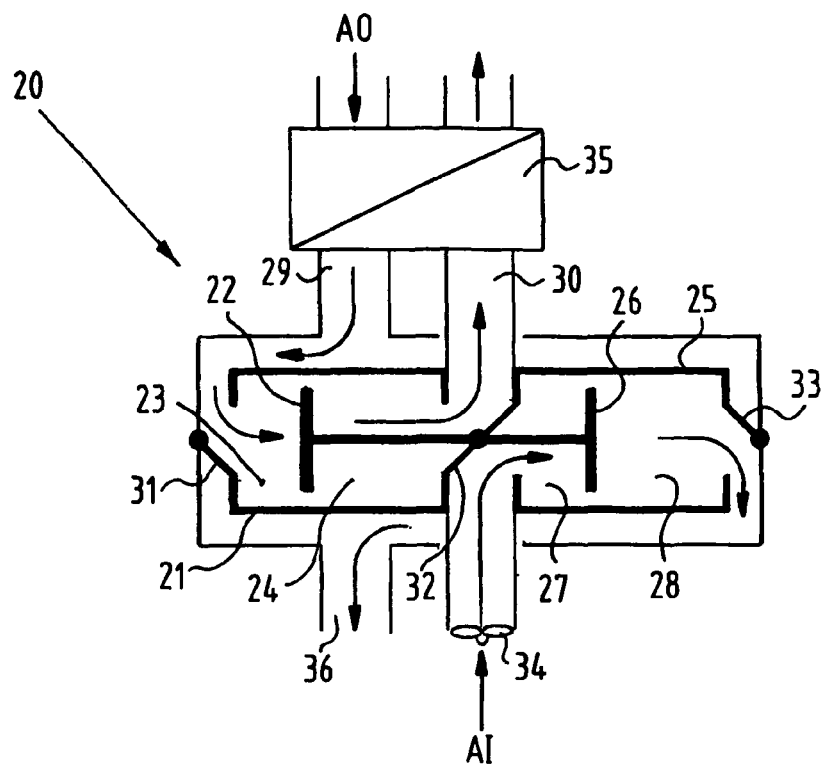
FIGS. 3A and 3B show schematic view of a second embodiment of a ventilation system according to the invention.
Figure 3B:
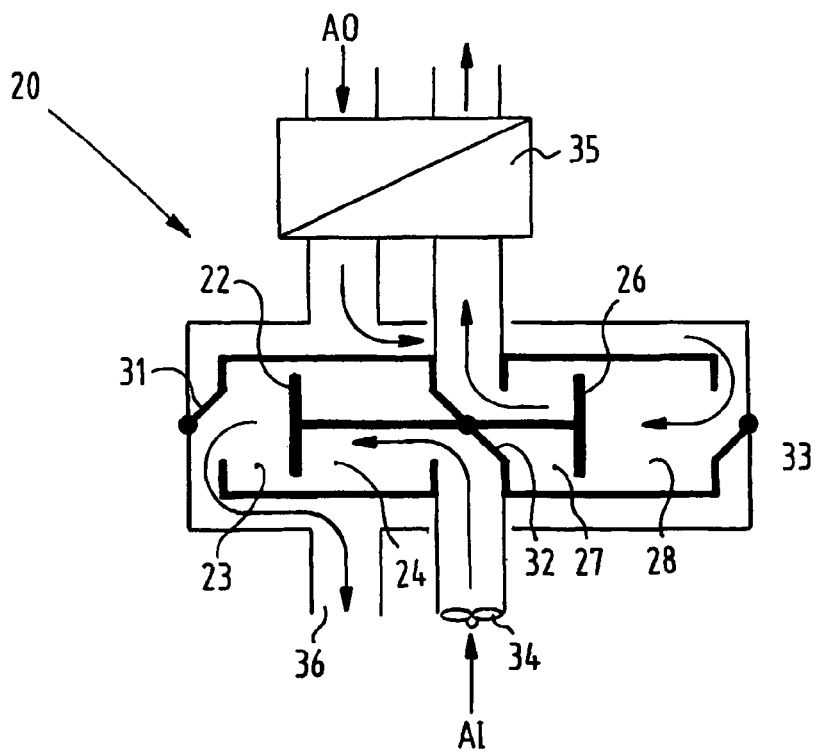

FIGS. 3A and 3B show a second embodiment of a ventilation system 20 according to the invention. The ventilation system 20 comprises a first double acting cylinder 21 with a piston 22. The piston defines the cylinder 21 into a first chamber 23 and a second chamber 24.

The ventilation system 20 has furthermore a second double acting cylinder 25 with a piston 26. This piston defines the cylinder 25 into a third chamber 27 and a fourth chamber 28. Both pistons 22 and 26 are connected to each other. The four chambers 23, 24, 27, 28 are connected through a series of tubing 29, 30 in which three valves 31, 32, 33 are arranged. In FIG. 3A the three valves 31, 32, 33 are in a first position.

Inside air AI is drawn in by a ventilator 34. Outside air AO flows through a heat exchanger 35 and enters the first chamber 23. Due to the driving force of the ventilator and to the pressure difference between the outside air AO and the inside air AI, the both pistons 22, 26 are moved to the right. Due to this movement air from the fourth chamber 28 is expelled through opening 36 into a room. Air in the second chamber 24 is urged through the heat exchanger 35 and to the outside. When the pistons 22, 26 reach their outer right position the valves 31, 32, 33 are put in their second position, shown in FIG. 3B. Inside air AI is now urged into the second room 24 and outside air AO is drawn into the fourth room 28. Again due to the pressure difference the pistons 22, 26 are now moved to the left. The Inside air AI, which was stored in the third chamber 27 is now urged through the heat exchanger 35. The outside air AO, which was stored in the first room 23 is now expelled through opening 36 to the inside.

This mechanism ensures that both air flows are balanced.

The invention claimed is:

1. A ventilation system for exchanging outside air with air in a room, comprising:

a fine wire heat exchanger formed with first and second channels configured in heat-exchanging contact and each defined with respective inlets and outlets, and arranged to have the first channel inlet and the second channel outlet to be in fluid communication with the outside air, and the first channel outlet and the second channel inlet to be in fluid communication with the air in the room; and a means for balancing respective flows of air through the first and second channels to maximize heat exchange between the respective flows, wherein the means for balancing comprises:

a ventilator arranged in a first channel;

a ventilator arranged in a second channel;

at least four temperature sensors arranged in the outlets and inlets of the first and second channels; and a controller for comparing the readings of the temperature sensors and for controlling the ventilators in the first and second channels, such that the temperature difference between the inlet and outlet of the first channel is approximately equal to the temperature difference between the inlet and outlet of the second channel.

2. The ventilation system according to claim 1 and adapted for cleaning in a dishwasher, wherein the heat exchanger is removably configured to have dimensions enabling receipt within the dishwasher.

3. The ventilation system according to claim 1, wherein the heat exchanger is configured to have a length, a width, and a height each less than about 0.55 meters.

4. A ventilation system for exchanging outside air with air in a room, comprising:

a fine wire heat exchanger formed with first and second channels configured in heat-exchanging contact and each defined with respective inlets and outlets, and arranged to have the first channel inlet and the second channel outlet to be in fluid communication with the outside air, and the first channel outlet and the second channel inlet to be in fluid communication with the air in the room; and a means for balancing respective flows of air through the first and second channels to maximize heat exchange between the respective flows, wherein the means for balancing comprises:

a first double-acting cylinder incorporating a first piston defining first and second chambers;

a second double-acting cylinder including a second piston connected to the first piston and defining third and fourth chambers;

whereby displacement of the first piston to enlarge the first chamber thereby enlarges the third chamber; and wherein the means for balancing is further defined with an inlet and an outlet and a means for controlling fluid communication between:
  a. the first channel with the first and fourth chambers;
  b. the second channel with the second and third chambers;
  c. the inlet with the second and third chambers; and
  d. the outlet with the first and fourth chambers.

5. The ventilation system according to claim 4, further comprising:
  at least one ventilator in fluid communication with one or more of the group that includes the inlet, the outlet, the first channel, and the second channel.

6. The ventilation system according to claim 4, further comprising:
  a means for driving at least one of the first and second pistons.

7. The ventilation system according to claim 6, wherein the means for driving further incorporates at least one linear motor.

8. A ventilation system adapted to be integrally mounted in a façade wall of a room and configured for communicating air inside the room with outside air through the façade wall, comprising:

a fine wire heat exchanger formed with first and second channels, configured in heat-exchanging contact and each defining respective inlets and outlets, and arranged to have the first channel inlet and the second channel outlet to be in fluid communication with the outside air, and the first channel outlet and the second channel inlet to be in fluid communication with the air in the room; and a means for balancing respective flows of air through the first and second channels to maximize heat exchange between the respective flows, wherein the means for balancing comprises:

a ventilator arranged in a first channel;

a ventilator arranged in a second channel;

at least four temperature sensors arranged in the outlets and inlets of the first and second channels; and a controller for comparing the readings of the temperature sensors and for controlling the ventilators in the first and second channels, such that the temperature difference between the inlet and outlet of the first channel is approximately equal to the temperature difference between the inlet and outlet of the second channel.

9. A ventilation system adapted to be integrally mounted in a façade wall of a room and configured for communicating air inside the room with outside air through the façade wall, comprising:

a fine wire heat exchanger formed with first and second channels configured in heat-exchanging contact and each defining respective inlets and outlets, and arranged to have the first channel inlet and the second channel outlet to be in fluid communication with the outside air, and the first channel outlet and the second channel inlet to be in fluid communication with the air in the room; and a means for balancing respective flows of air through the first and second channels to maximize heat exchange between the respective flows, wherein the means for balancing comprises:

a first double-acting cylinder incorporating a first piston defining first and second chambers;

a second double-acting cylinder including a second piston, connected to the first piston, and defining a third and a fourth chamber;

whereby displacement of the first piston to enlarge the first chamber thereby enlarges the third chamber; and wherein the means for balancing is further defined with an inlet and an outlet and a means for controlling fluid communication between:
  a. the first channel with the first and fourth chambers;
  b. the second channel with the second and third chambers;
  c. the inlet with the second and third chambers; and
  d. the outlet with the first and fourth chambers.

10. The ventilation system according to claim 9, further comprising:
  at least one ventilator in fluid communication with one or more of the group that includes the inlet, the outlet, the first channel, and the second channel.

11. The ventilation system according to claim 9, further comprising:
  a means for driving at least one of the first and second pistons.

12. A ventilation system for mounting in a wall of a room, the wall having a thickness, and the ventilation system being configured to communicate air inside the room with air outside the wall, comprising:

a fine wire heat exchanger, configured with a cross-sectional thickness that is approximately equal to the wall thickness, and formed with first and second channels in heat-exchanging contact, the channels being defined with respective inlets and outlets, and wherein the first channel inlet and the second channel outlet are in fluid communication with the outside air, and wherein the first channel outlet and the second channel inlet are in fluid communication with the air inside the room; and a means for balancing respective flows of air through the first and second channels to maximize heat exchange therebetween, wherein the means for balancing comprises:

a ventilator arranged in a first channel;

a ventilator arranged in a second channel;

at least four temperature sensors arranged in the outlets and inlets of the first and second channels; and a controller for comparing the readings of the temperature sensors and for controlling the ventilators in the first and second channels, such that the temperature difference between the inlet and outlet of the first channel is approximately equal to the temperature difference between the inlet and outlet of the second channel.

13. A ventilation system for mounting in a wall of a room, the wall having a thickness, and the ventilation system being configured to communicate air inside the room with air outside the wall comprising:
- a fine wire heat exchanger, configured with a cross-sectional thickness that is approximately equal to the wall thickness, and formed with first and second channels in heat-exchanging contact, the channels being defined with respective inlets and outlets, and wherein the first channel inlet and the second channel outlet are in fluid communication with the outside air, and wherein the first channel outlet and the second channel inlet are in fluid communication with the air inside the room; and
- a means for balancing respective flows of air through the first and second channels to maximize heat exchange therebetween, wherein the means for balancing comprises:
  - a first double-acting cylinder incorporating a first piston defining first and second chambers;
  - a second double-acting cylinder including a second piston connected to the first piston and defining third and fourth chambers;
  - whereby displacement of the pistons to enlarge the first chamber thereby enlarges the third chamber; and
  - wherein the means for balancing is further defined with an inlet and an outlet and a means for controlling fluid communication between:
    a. the first channel with the first and fourth chambers;
    b. the second channel with the second and third chambers;
    c. the inlet with the second and third chambers; and
    d. the outlet with the first and fourth chambers.

* * * * *

UNITED STATES PATENT AND TRADEMARK OFFICE
CERTIFICATE OF CORRECTION

PATENT NO. : 7,837,127 B2
APPLICATION NO. : 10/557512
DATED : November 23, 2010
INVENTOR(S) : Kristinsson et al.

It is certified that error appears in the above-identified patent and that said Letters Patent is hereby corrected as shown below:

Column 7, Line 1, Claim 13, "A ventilation s stem" should read -- A ventilation system --

Signed and Sealed this
Twenty-ninth Day of March, 2011

David J. Kappos
*Director of the United States Patent and Trademark Office*